April 30, 1935. D. R. LAMONT Re. 19,556

METHOD OF CONTROLLING CHARACTERISTICS OF SPRAY PROCESS PRODUCTS

Original Filed Oct. 3, 1927 6 Sheets-Sheet 1

Fig. 1,

INVENTOR
Dallas R. Lamont
BY
Richard K. Stevens
ATTORNEY

April 30, 1935. D. R. LAMONT Re. 19,556

METHOD OF CONTROLLING CHARACTERISTICS OF SPRAY PROCESS PRODUCTS

Original Filed Oct. 3, 1927 6 Sheets-Sheet 2

INVENTOR
Dalias R. Lamont
BY
Richard K. Stevens
ATTORNEY

METHOD OF CONTROLLING CHARACTERISTICS OF SPRAY PROCESS PRODUCTS

Original Filed Oct. 3, 1927 6 Sheets-Sheet 3

INVENTOR
Dallas R. Lamont
BY
Richard K. Stevens
ATTORNEY

METHOD OF CONTROLLING CHARACTERISTICS OF SPRAY PROCESS PRODUCTS
Original Filed Oct. 3, 1927 6 Sheets-Sheet 4
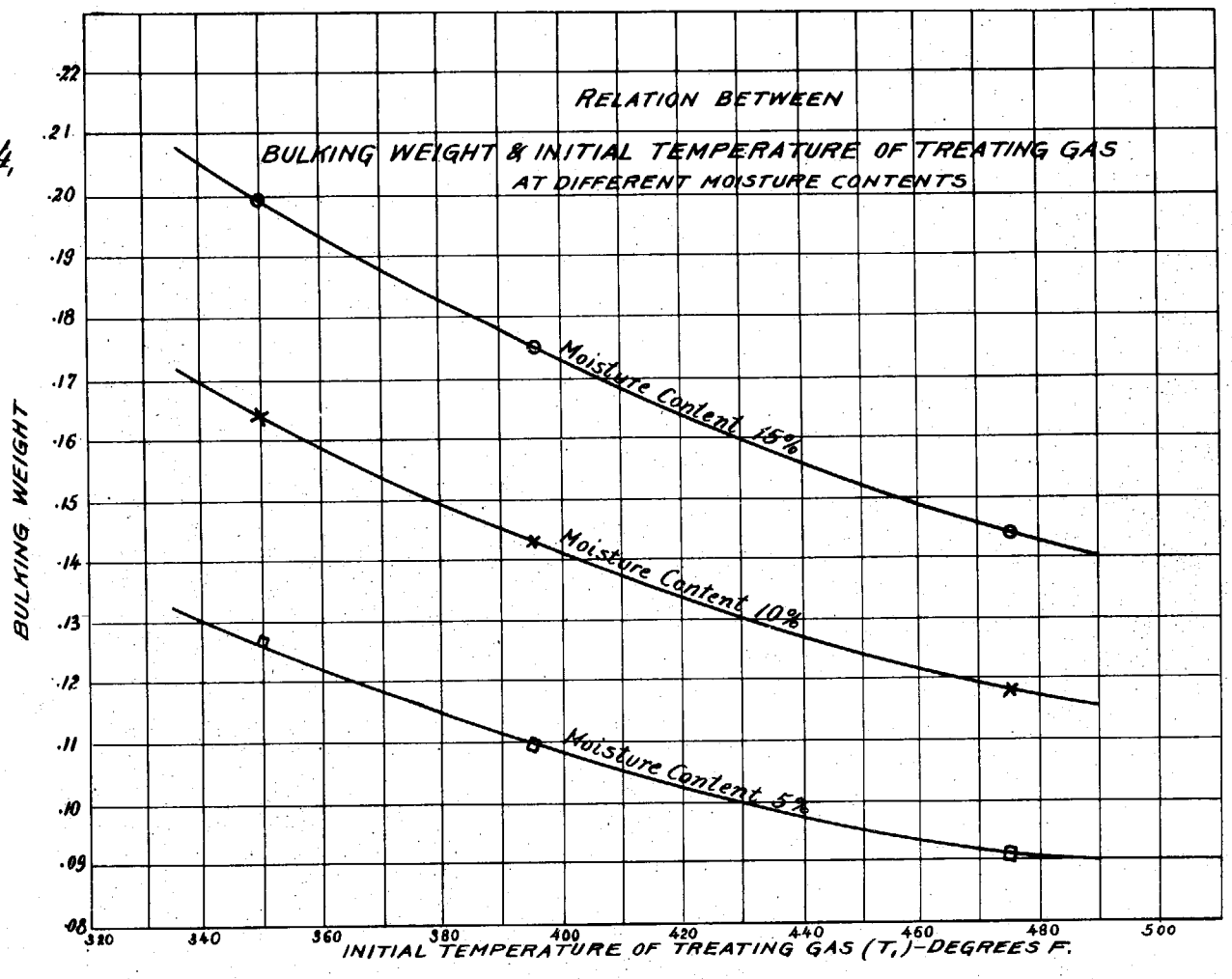
Fig. 4,
INVENTOR
Dallas R. Lamont,
BY Richard K. Stevens
ATTORNEY METHOD OF CONTROLLING CHARACTERISTICS OF SPRAY PROCESS PRODUCTS
Original Filed Oct. 3, 1927 6 Sheets-Sheet 5
Fig. 5,
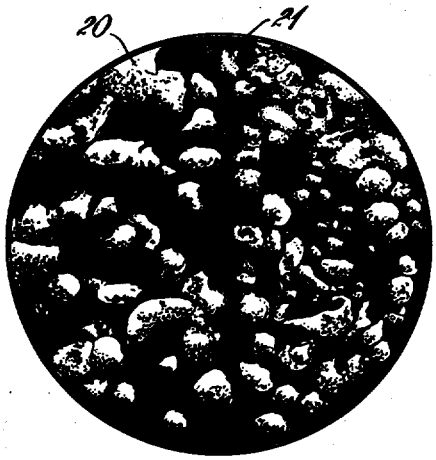
Fig. 7,
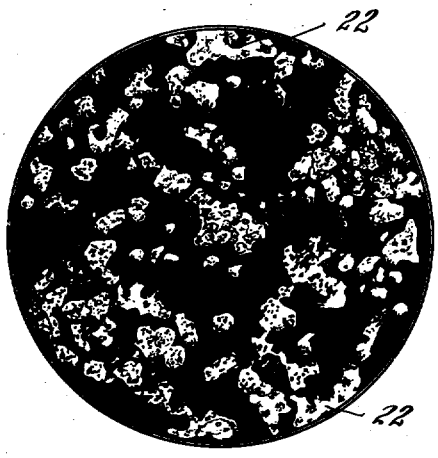
Fig. 6,
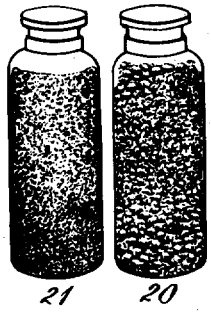
Fig. 8,
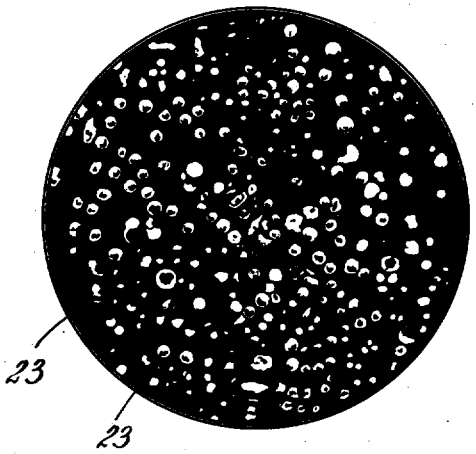
INVENTOR
Dallas R. Lamont
BY Richard K. Stevens
ATTORNEY METHOD OF CONTROLLING CHARACTERISTICS OF SPRAY PROCESS PRODUCTS
Original Filed Oct. 3, 1927 6 Sheets-Sheet 6
Fig. 9
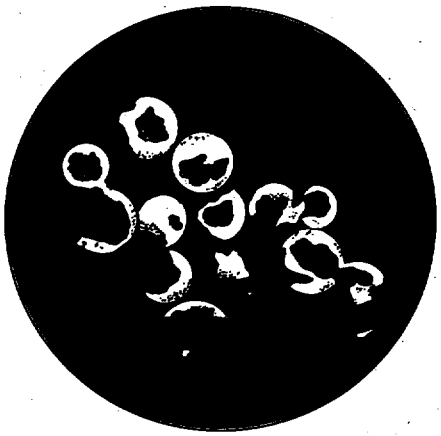
Fig. 10,
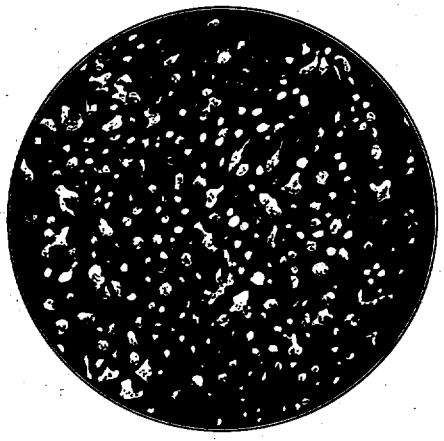
Fig. 12,
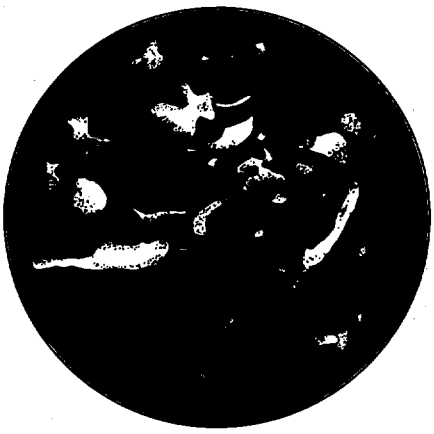
Fig. 13,
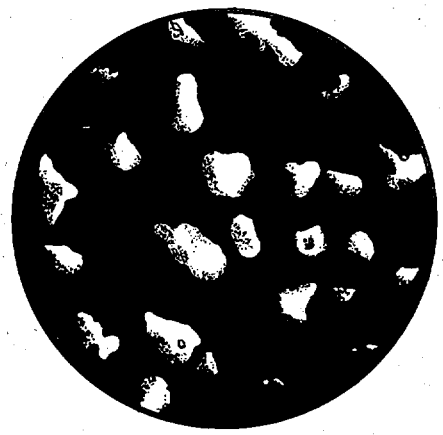
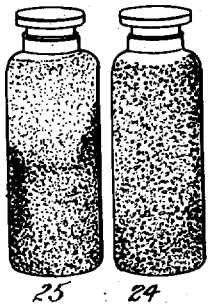
Fig. 11
INVENTOR
Dallas R. Lamont
BY
Richard K. Stevens
ATTORNEY Reissued Apr. 30, 1935 Re. 19,556

UNITED STATES PATENT OFFICE 19,556

METHOD OF CONTROLLING CHARACTERISTICS OF SPRAY PROCESS PRODUCTS

Dallas R. Lamont, Brooklyn, N. Y., assignor to Industrial Spray-Drying Corporation, New York, N. Y., a corporation of Delaware Original No. 1,734,260, dated November 5, 1929, Serial No. 223,730, October 3, 1927. Application for reissue May 26, 1931, Serial No. 540,169

14 Claims. (Cl. 159—48)

Figure 1:
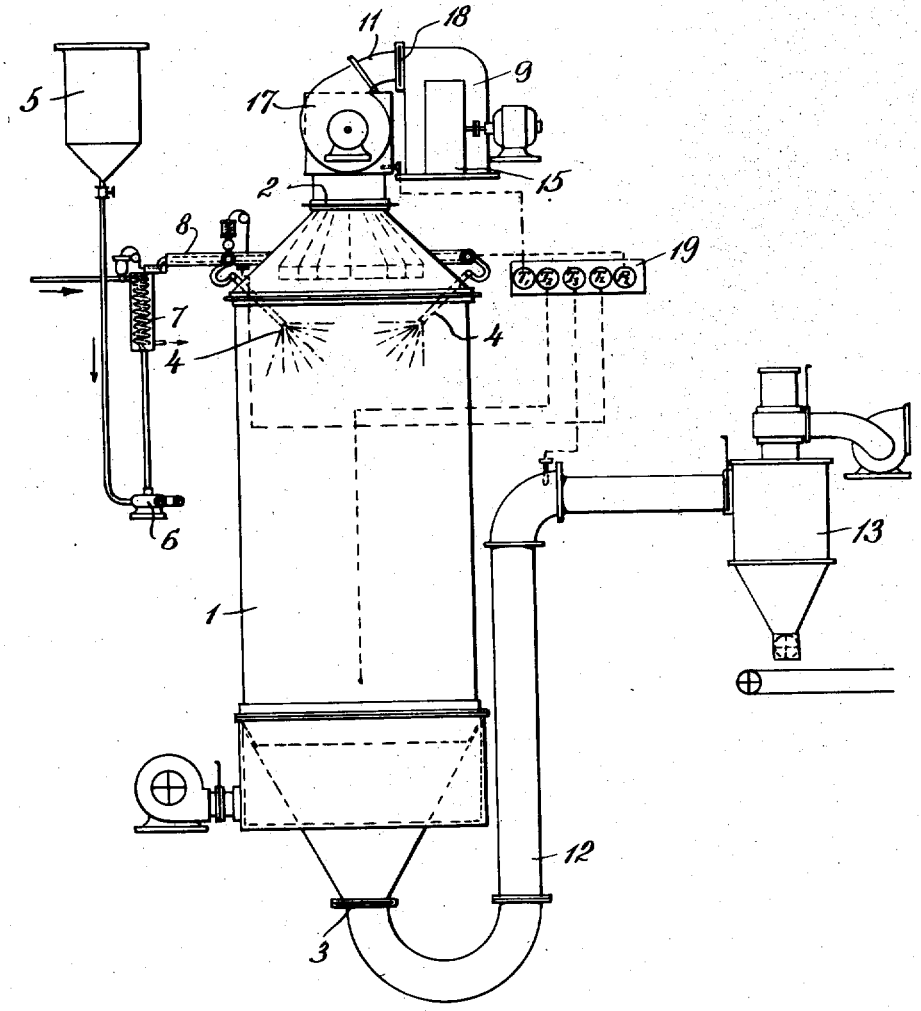

The present invention relates to spray processing of materials and the production of a product therefrom which is in more or less finely divided condition and is composed of particles having a reasonably stable individually distinct form and structure, and the invention has to do particularly with the processing of a certain described class of materials in such manner as to definitely vary or control, within reasonable limits, the structure of the component particles of the ultimate product, thereby effecting a corresponding variation and control of certain correlated properties or characteristics of the product, such as speed of solubility, particle size, particle shape, and more particularly bulking weight; i. e., the weight of a given bulk or volume of the product.

In spray processing certain materials the ultimate product may be obtained in hollow particle form. The present invention is based primarily on the discovery that in so spray processing such materials to obtain the hollow particle form, it is possible to control and vary the degree of hollowness or extent of void space of the individual particles of the spray processed product within substantial limits by appropriately controlling and varying certain of the variables of the process. As a result of so varying and controlling the degree of hollowness of the component particles of the product, certain other physical characteristics of the product may also be correspondingly controlled and varied. This possibility of controlling the degree of hollowness of the individual particles of the treated product and controlling to a corresponding degree certain correlated characteristics of the product has been found to be of particular practical importance. For example, a product composed of hollow thin-walled bubble-like particles is of light bulking weight for the reason that a large proportion of the bulk occupied by the product is represented by the hollow spaces within the respective, individual particles. On the other hand, a product wherein the component particles are hollow to a lesser degree or are not hollow at all is of relatively heavy bulking weight. Particle size also affects bulking weight of the product for the reason that the percentage of voids or interstices between adjacent particles in a bulk of the product varies with particle size. The light bulking product is of advantage where it is desired that a small weight of the product fill a sizable carton or package, as, for instance, certain products sold at retail in small packages. The heavy bulking product is ordinarily desired in industrial use where package cost, storage space required, etc., are important. The light bulking product composed of hollow thin-walled particles is ordinarily quickly soluble. The thin-walled particle structure has the effect of providing a large surface of the material which is accessible to the solvent. As another instance, the heavy bulking product having substantially solid particles is ordinarily a particularly fine-grained product. The reason for this is that when the material occurs in the form of a solid or heavy walled particle the size of the particle is much less than it would be if the same amount of material were present in the form of an inflated particle in which all of the material occurs as a relatively thin shell enclosing a hollow space. On the other hand, if it is desired to avoid small particles or dust in the product the inflated hollow type of particle may be produced.

Figure 2:
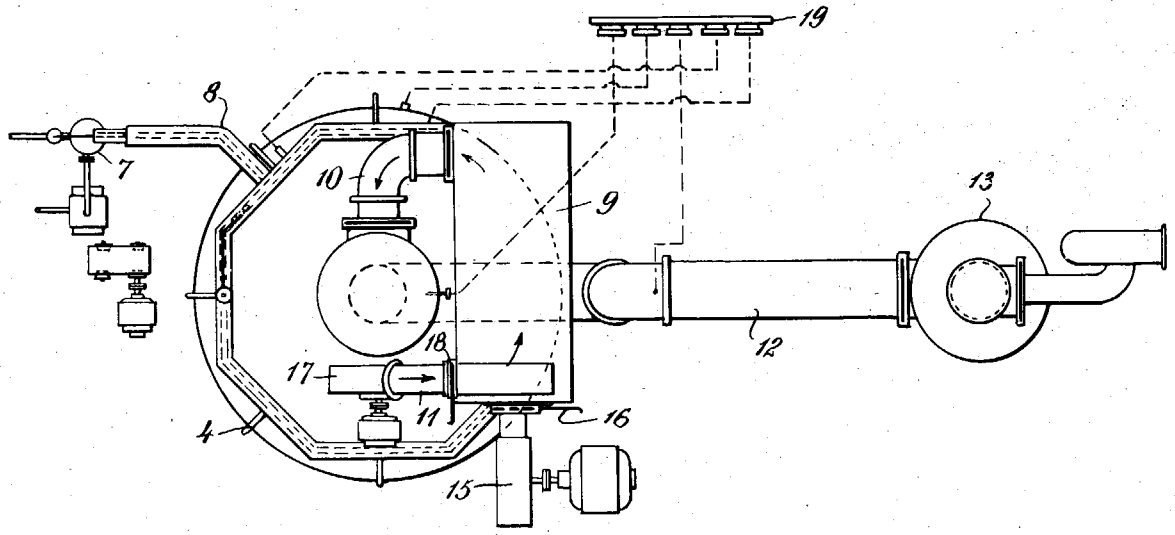
Figure 3:
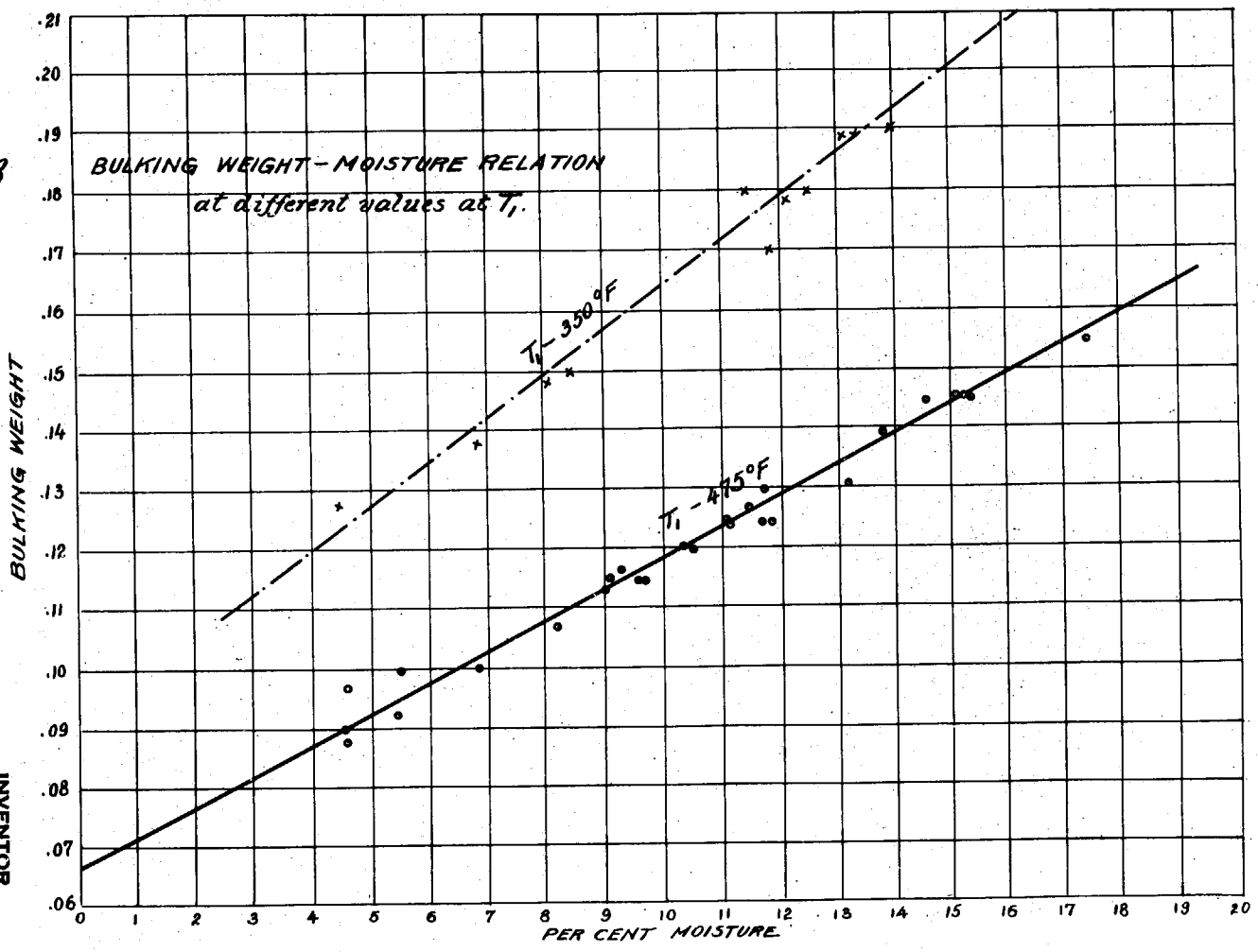

The accompanying drawings wil be of assistance in further illustrating and describing the invention. In the said drawings, Figure 1 is a general outline view in elevation of an apparatus in which the process of the present invention may be conducted; Figure 2 is a plan view of the apparatus shown in Figure 1; Figures 3 and 4 are curves illustrating the variation in bulking weight of a spray processed product which can be effected by appropriately varying certain of the process conditions; Figures 5 to 13 are reproductions of photomicrographs and photographs of spray processed products illustrating the variation in the physical characteristics of the particles of the spray processed product which can be effected by appropriately varying certain of the process conditions The apparatus here shown by way of illustration is particularly designed for carrying out a process wherein the material being processed is in liquid form and wherein the sprayed or dispersed material and the treating gas pass in concurrent flow through the treating chamber. The process can, however, be conducted in apparatus other than that here illustrated. Referring particularly to Figures 1 and 2, the chamber in which the material is treated is shown as a vertical cylindrical tower 1 having an inlet opening 2 at its upper end for the admission of treating gas and an outlet 3 at its lower end for the discharge of the treated material and the spent treating gas. The liquid material is sprayed into the upper portion of the tower 1 by means of suitable spray nozzles 4. The material is, for example, drawn from the liquid storage reservoir 5 by means of pump 6, from whence it is passed through the liquid heater 7 and is delivered through jacketed line 8 to nozles 4 in desired quantity at appropriate controlled temperature and pressure. The heat energy required for the process is supplied directly by the gas or oil burning furnace 9. The hot products of combustion from the furnace 9 pass through duct 10 into the upper end of the tower 1 and serve as treating gas for the material to be processed. A further source of treating gas as, for instance, atmospheric air may be mingled with the products of combustion by supplying such gas through duct 11 which duct, after jacketing the furnace 9 as shown, joins with duct 10, so that the gases delivered through both ducts 10 and 11 are passed together into the tower 1 through inlet opening 2. The fan 15 and damper 16 control the amount of combustion supporting gas supplied to the furnace to correspond to any desired fuel consumption, and fan 17 and damper 18 control the amount of cooler gas mingled with the products of combustion, whereby any desired quantity of heat can be supplied to the tower 1 at any desired gas temperature. Upon entering the tower 1, the incoming treating gas comes into direct contact with the sprays of liquid material issuing from nozles 4. It will be understood that heated air or other gas may be employed as treating gas if it is desired to avoid direct contact of the material being treated with products of combustion. The treating gas passes through the tower 1 in continuous flow, and the drops or particles of the sprayed material are entrained in the treating gas and are positively propelled by the gas current down along the length of the tower 1 while the treatment of the material is taking place. The entire contents of the drying tower 1, including the current of spent drying gas and the particles of treated material entrained in it, are discharged continuously through the outlet 3 at the bottom of the tower and are conveyed through duct 12 into the collectors 13 which serve to separate the treated material from the current of spent treating gas. The instrument board 19 carries the various recording instruments which record temperatures and pressures at various parts of the system as indicated on Figure 1 of the drawings. This apparatus is more particularly shown and described in the copending application of Ben Forrest Uhl, Serial No. 216,809, filed September 1, 1927.

The class of materials which may be processed in accordance with this invention to yield a finished product of definitely controlled physical characteristics may be defined as consisting of those materials which, when they are in finely divided dispersed condition and are subjected to the heat of the spray processing operation, have the property of assuming a continuous coherent film forming shape retaining condition which is self-sustaining and stable in hollow particle form. All materials which at some degree of concentration are heavy and viscid as, for example, malt syrup, sodium silicate, etc., appear to posses this property. When such materials are in finely divided dispersed condition they readily form small drops or bubbles which, by means of the present process, may be made hollow to a greater or lesser degree as desired. Certain other materials which are not truly viscid or syrupy but which, nevertheless, consist of a continuous molten or dissolved mass, as for instance soap, can be converted into the controlled hollow particle form under appropriate process conditions, which conditions are normally fairly critical for this class of products. Materials which are composed of independent grains or crystals not particularly bound or held together as, for instance, common salt treated at temperatures below the melting temperature of the salt, do not ordinarily possess this property of forming hollow particles to any apreciable extent. Even with such products, however, particles showing some slight degree of hollowness have been obtained. A mixture of products of this latter type with products which possess the property of hollow particle formation will exhibit the property of hollow particle formation to an extent depending somewhat upon the proportion of the ingredient which can be produced in hollow particle form.

The degree of hollowness of the component particles of the spray processed product can be controlled in different ways. The initial temperature of the treating gas as it first comes into contact with the dispersed material being treated is particularly important in controlling the hollow condition of the particles and thereby also controlling correlated physical characteristics of the finished product such as bulking weight, particle size, speed of solubility, etc. For example, a soap product has been produced substantially dry reasonably finely divided condition consisting of hollow particles controlled as to degree of hollowness by the method described herein. A typical soap product of this character produced with an initial treating gas temperature ($T_1$) of about 475° F. is a relatively light bulking product of hollow thin-walled particle structure. The particles of the product are, in effect, dried, solidified soap bubbles consisting essentially of an enclosing shell or wall of soap material having within it a single void. This product has a bulking weight of about 0.12 with respect to the weight of water, that is, 100 c. c. of the product in its hollow particle form weigh 12 grams. The average diameter of the particles of the product is about 0.75 mm. The product is completely soluble in water under certain test conditions in from 10 to 15 seconds. Another soap product made from the same soap stock sprayed from the same nozzles at the same pressure and temperature of spraying but produced with an initial treating gas temperature of about 350° F. has a bulking weight of about 0.17, an average particles size of about 0.4 mm. and a speed of solubility of about 30 seconds under the same test conditions above referred to. The particle structure in the latter heavier product is in general the same hollow structure as that of the particles of the lighter product except that the particles in the heavier product are smaller and the particle walls are heavier, that is, the particles are hollow to a somewhat lesser degree. These differences in the characteristics of the particles of the respective products are evident by a comparison of the two products under the microscope, as in Figure 5, which is a reproduction of a photomicrograph of the two products taken at the same magnification on the same plate. The lighter product is indicated at 20 and the heavier product at 21. The difference in particle size of the two products is further shown in Figure 6, which is a reproduction of an actual size photograph of the two products, the lighter product being shown at 20 and the heavier product at 21. In the production of the two products just described, all of the principal process conditions were the same except the initial temperature of the treating gas. The lower initial temperature in the second instance resulted in the production of a product showing substantially 50% increase in bulking weight, 100% increase in time required for complete solubility and approximately 40% decrease in average particle size. These differences in the physical characteristics of the two products are probably due to the fact that in the first product the particles are inflated or expanded to a considerably greater degree than in the second product. With all of the process conditions identical in both instances except the initial gas temperature, particularly the type of nozzle used, temperature of liquid as sprayed and pressure of liquid as sprayed,—it is likely that the soap particles or drops formed by the spray nozzles were about the same in both instances, that is, in both instances the sprayed soap particles as initially formed contained about equal amounts of soap. But in the first sample 21 the average particle size is smaller for the reason that the same amount of soap is incorporated into a smaller less completely hollow particle; the bulking weight is heavier for the reason that the individual particles containing a given amount of soap occupy a smaller space; and the time required for complete solubility is longer for the reason that the particles are heavier walled and thus expose a lesser amount of surface per unit weight of the product to the solvent action of the water. The difference in bulking weight of the soap products just described and the fact that this difference is attributable to the difference in initial treating gas temperatures in the spray processing of the product is well illustrated by the curves shown in Figures 3 and 4. The bulking weight of a soap product produced under constant process conditions of temperature and spraying pressure varies in accordance with increase in moisture content, and the curves shown in Figure 3 are plotted to values of bulking weight as ordinates and percentage of moisture content as abscissæ. These two curves are plotted from data taken on a large number of samples of the same soap material produced at an initial treating gas temperature of about 475° F. and about 350° F. as indicated, the other process variables remaining substantially constant. The wide separation of the two curves indicates the definite variation and control in the bulking weight of the spray processed product which can be effected by an appropriate variation and control of the initial temperature of the treating gas. The curves of Figure 4 show directly the effect of change in initial temperature of treating gas on bulking weight of the product. The curves are plotted to values of bulking weight as ordinates and values of initial treating gas temperature as abscissæ, for the respective moisture contents indicated, and the points from which the curves are plotted are the readings from the bulking weight—moisture content curves of Figure 3 and from an additional curve for an intermediate value of $T_1$ not shown in Figure 3.

This control of the degree of hollowness of the particles of a spray processed product by controlling the temperature to which the particles of the sprayed material are subjected can also be effected in the treatment of other materials of the general class above defined. Sodium silicate, for example, which has been produced in dry powder form by spray processing a solution of sodium silicate at an initial treating gas temperature of 500° F. has a bulking weight of 0.41. Another sample of sodium silicate produced from the same sodium silicate solution at the same concentration sprayed through the same nozzles at substantially the same spraying pressure and liquid temperature but with an initial treating gas temperature of 300° F. has a bulking weight of 0.81. Thus, a change of 200° F. in the initial treating gas temperature results, in this instance, in doubling the bulking weight of the finished product. The particle structure of a very light bulking sodium silicate of hollow bubble-like particle formation is shown in Figure 7, and the particle structure of a relatively heavy bulking sodium silicate is shown in Figure 8, the product in both figures having been crushed with fairly heavy pressure under a spatula to thus break down some of the particles so that the degree of hollowness of the particles and the thickness of the particle walls may be seen. The particles of the light bulking product shown in Figure 7 are light airy thin-walled bubbles which readily break down into "egg-shell" fragments under pressure. The extreme thinness of the particle walls is illustrated in Figure 7, certain typical thin-walled particles being specifically indicated by the reference character 22. In this product the particle walls are so thin as to be extremely difficult to photograph. The particles of the heavier bulking product shown in Figure 8 are also hollow particles but have particle walls which are very much more substantial. In this latter product the thickness of the wall relative to the diameter of the particle can be seen to be appreciably greater than it is in the light bulking product of Figure 7. Certain typical particles are indicated by the reference character 23.

As a still futher example of this control of the degree of hollowness of the particles, bulking weight of the product, etc., by controlling the initial treating gas temperature, gelatin produced in powder form at an initial temperature of 520° F. showed a bulking weight of 0.055, while the same product produced under the same conditions except that the initial gas temperature employed was 400° F. showed a bulking weight of 0.086, representing an increase of over 50% in bulking weight due to the decrease in the temperature of the treating gas.

The production of the hollow thin-walled bubble-like particles at the high initial treating temperatures is probably due to the fact that, when the particles of the sprayed material are exposed to the action of the relatively high initial temperature, a rapid conversion of the moisture in the respective sprayed particles into steam occurs, and the steam thus generated within the particle exerts an expanding or puffing action which inflates the particle into the form of a bubble. The moisture absorbing gas surrounding the particles dries and solidifies them in their inflated condition, and therefore the particles of the ultimate product are hollow. The higher the initial treating temperature, the greater will be this inflating action and the lighter will be the bulking weight of the product. In the production of the heavier walled particles it is possible that no actual inflation of the sprayed drops of material occurs, but that during the formation of the hollow particle the material constituting the outside of the particle assumes a shape retaining condition sooner than the material constituting the inner portion of the particle, whereby the particle assumes a permanent outward form and size while continued volatilization of material within the particle leaves a void so that the particle is, to a certain extent, hollow but may at the same time be even smaller in size than the original particle or drop of material from which it was formed. This theory is stated by way of explanation, and its accuracy is not insisted upon.

The temperature of the liquid as sprayed is of a certain importance in controlling the bulking weight and allied characteristics of spray processed products. For example, a soap powder consisting of a mixture by weight of soap and sodium carbonate occurring in the ratio of about 1:2 of dry soap solids and dry sodium carbonate which was processed at a spraying temperature ($T_L$) of about 190° F. averaged about 0.25 in bulking weight. This same product processed under the same conditions except that a considerably higher liquid temperature at the sprays was used, namely, about 250° F., showed an average bulking weight of about 0.42. In the lighter bulking product the particles are larger and more completely hollow. The difference in particle structure and degree of hollowness is shown in Figures 9 and 10, which show respectively the particles of the lighter bulking weight product and the heavier bulking weight product, each crushed under a spatula. The particles of the light bulking weight product of Figure 9 crushed easily, and the particles are fairly large and thin-walled, as shown. The product of Figure 10 was subjected to a fairly heavy pressure under a spatula, but even under such pressure the majority of the particles remained unbroken. The particles of this heavier bulking weight product of Figure 10 are relatively heavy walled and small, as shown. The difference in particle size is further illustrated in Figure 11, in which the product indicated at 24 is the lighter bulking weight product of larger particle size and the product indicated at 25 is the heavier bulking weight product of smaller particle size. The effect of the spraying temperature of the liquid on such characteristics of the finished product as bulking weight, degree of hollowness of the particles, etc., appears to be due largely to the change in the viscosity or flowing characteristics of the liquid as sprayed. With this soap powder, the liquid as sprayed is much more fluent at 250° F. than it is at 190° F. It is likely that the relatively free flowing liquid produced by the high spraying temperature may break up into smaller particles at the spray and also, being less viscous or tenuous, may require a greater length of time in the process to attain to its coherent shape retaining condition so that the particles shrink down to a smaller size and a less hollow structure before reaching a self-sustaining condition.

Another condition which is important in controlling the degree of hollowness of the particles of a spray processed product is the dilution of the liquid material as sprayed. With sodium silicate, for instance, a spray processed product produced from a solution containing 5% solids showed a bulking weight of 0.55, a product produced from a 20% solution showed a bulking weight of 0.41. Thus, as the concentration of the liquid is increased the bulking weight of the product decreases. This decrease of bulking weight with increase of liquid concentration is probably due to the fact that, as the liquid is made more concentrated, its viscosity increases and therefore the bulking weight is decreased, the degree of hollowness of the particles is increased, etc., for the reasons above stated. As another example, a 20% gelatin solution when spray processed produced a product having a bulking weight of 0.055, while a 10% solution processed in the same way produced a product having a bulking weight of 0.065.

The possibility of controlling the degree of hollowness or degree of inflation of the particles of spray processed products is also of value in controlling, to a certain extent, particle shape and particularly in obtaining reasonably smooth, rounded, generally globular particle shapes from products which do not normally yield such particle shapes. A typical instance is soap. Spray dried soap normally has a shredded, fragmentary particle shape and structure. A soap product having this typical shredded structure is shown in Figure 12, and was produced by spray processing soap at a relatively low initial treating gas temperature of about 200° F. This shredded particle structure can be eliminated by the present process, and particles of reasonably regular generally globular shape can be obtained by effecting an inflation of the particles. The product shown in Figure 13 is the same soap as is shown in Figure 12 and is produced under substantially the same conditions as the product of Figure 12 except that the initial temperature of the treating gas was increased to 475° F. The particles of the product of Figure 13 are hollow inflated particles of generally globular shape. This inflating action appears to be the result of an internal expansion due to the generation of steam within the respective particles. The generated steam appears to exert an expansive force which acts uniformly outwardly in all directions and thus inflates the particles into reasonably regular, generally spherical, rounded conformation. Various particle shapes ranging between the shapes shown in Figures 12 and 13 can be obtained depending upon the degree to which the particles are inflated or made hollow. In general, a lesser degree of inflation gives a less perfect rounded particle form. This is illustrated by Figure 5 where it is seen that the product composed of the lighter more hollow particles has a particle shape which is more rounded and free from shreds and angular formations than is the product composed of the smaller heavier particles.

The possibility of controlling the inflation of the particles of spray processed products is of value in producing products in powder form or in reasonably finely divided condition which, however, are not dusty. An instance of this is soap powder, essentially a mixture of soap and sodium carbonate. Such soap powder as ordinarily manufactured is extremely dusty. When a package of the product is opened and shaken a fine dust arises from the product, and this dust is not only noticeable to the eye but is particularly annoying to the nose and throat. Soap powder produced according to the present invention and having the inflated hollow particle structure is entirely free from such dust. The product may be violently shaken in bulk without producing any substantial amount of dust noticeable to the eye or nose. The inflated particles are light and bubble-like and they stay suspended for some time when thrown into the air, but these particles do not in any sense constitute an impalpable dust or powder. This is probably due to the fact that the particles are of fairly large size. It is possible that particles which normally would be of dust size are inflated to dimensions above dust size and no longer have the characteristics of a dust.

The present invention therefore contemplates the method of controlling the characteristics of spray processed products as described herein. The invention particularly contemplates controlling the degree of hollowness of the component particles of the spray processed product and, as a result of so controlling the degree of hollowness of the particles, also controlling certain other characteristics of the product, substantially as described and set forth in the claims.

I claim:

1. In the spray processing of materials which, under the conditions of the process can be made to assume a continuous coherent shape retaining character self-sustaining in hollow particle form, the method of controlling the average degree of hollowness of the component particles of the resulting spray processed product, which comprises spraying the material being treated to convert it into reasonably finely divided dispersed condition, subjecting the finely divided dispersed material to a temperature sufficiently high to effect formation of hollow particles of material, controlling said temperature to produce particles of a desired average degree of hollowness, and effecting solidification of said hollow particles to thereby form the component particles of the finished spray processed product, whereby the degree of hollowness of the particles of the finished product and the other correlated characteristics of the product are definitely controlled, substantially as described.

2. In a spray processing of materials of the class described which can be reduced to a shape retaining condition self-sustaining in hollow particle form, the method of controlling the average degree of hollowness of the component particles of the finished spray processed product which comprises establishing a continuously flowing current of treating gas, dispersing the material to be treated in finely divided condition in said gas current, controlling the temperature of the said current of treating gas coming into contact with said finely divided dispersed material to a value sufficiently high to produce hollow particles of material, further controlling the temperature of the said treating gas to produce particles which are hollow to a desired degree, effecting solidification of said hollow particles to thereby form the component particles of the finished product controlled in degree of hollowness as desired, and then separating and collecting the solidified hollow particles from the current of treating gas to constitute the finished product.

3. In the spray processing of materials of the class described which, under certain conditions of concentration and heat can be reduced to a continuous coherent film-forming condition capable of inflation to hollow bubble-like form without disruption, the method of controlling the degree of hollowness of the component particles of the finished spray processed product which comprises establishing a continuously flowing current of treating gas, dispersing the material to be treated in finely divided condition in said gas current, maintaining the temperature of the current of treating gas which comes into contact with said finely divided dispersed material sufficiently high to volatilize a part of the material of the respective dispersed particles within the said respective particles to thereby generate expansive forces within the particles which effect an inflation of the respective particles of the dispersed material, controlling the said temperature of the treating gas to thereby control the rate of volatilization within the respective particles and consequently the degree of inflation thereof, and effecting solidification of said inflated particles to thereby form the component particles of the finished spray processed product, whereby the degree of inflation of the particles of the finished product and the other correlated characteristics of the product are definitely controlled.

4. In the spray processing of liquid materials which, under the conditions of temperature and concentration attained in the process assume a continuous coherent shape retaining character self-sustaining in hollow particle form, the method of controlling the average degree of hollowness of the component particles of the resulting spray processed product which comprises spraying the liquid material being treated to convert it into reasonably finely divided dispersed condition, subjecting the finely divided dispersed material to a temperature sufficiently high to effect formation of hollow particles of material when certain degrees of viscosity which it is possible to attain in the liquid material as sprayed are used, controlling the said viscosity of the liquid material as sprayed to thereby control the degree of hollowness of the said particles, and effecting solidification of said hollow particles to form the component particles of the finished spray processed product, whereby the degree of hollowness of the particles of the finished product and the other correlated characteristics of the product are definitely controlled, substantially as described.

5. In the spray processing of liquid materials of the class described which can be reduced to a continuous coherent shape retaining condition self-sustaining in hollow particle form, the method of controlling the average degree of hollowness of the component particles of the finished spray processed product which comprises establishing a continuously flowing current of treating gas, spraying the liquid material under treatment into said gas current in reasonably finely divided dispersed condition, controlling the temperature of the said current of treating gas coming into contact with said finely divided dispersed material to a value sufficiently high to effect formation of hollow particles of material when certain degrees of concentration at which the liquid material can be sprayed are used, controlling the concentration of the said liquid material as sprayed to thereby control the degree of hollowness of the said particles, and effecting solidification of the said hollow particles to thereby form the component particles of the finished spray processed product controlled as to degree of hollowness, substantially as described.

6. In the spray processing of liquid materials which under the conditions of temperature and concentration attained in the process assume a coherent shape retaining character of self-sustaining in hollow particle form, the method of controlling the average degree of hollowness of the component particles of the spray processed product which comprises establishing a continuously flowing current of treating gas, spraying the liquid material to be treated into said current of treating gas in reasonably finely divided dispersed condition, controlling the temperature of the said current of treating gas as it comes into contact with the said finely divided dispersed material to a value sufficiently high to produce hollow particles of material when certain temperature values of the liquid are sprayed which can be employed are used, controlling the temperature of the liquid as sprayed to thereby control the degree of hollowness of the said particles, and effecting solidification of said hollow particles to thereby form the component particles of the finished spray processed product, whereby the degree of hollowness of the particles of the finished product and the other correlated characteristics of the product are definitely controlled, substantially as described.

7. In the spray processing of materials of the class described which can be reduced to a continuous shape retaining condition self-sustaining in hollow particle form, the method of producing a light bulking product which comprises establishing a continuously flowing current of treating gas, dispersing the material to be treated in finely divided condition in said gas current, heating said current of treating gas to such temperature that, in coming into contact with the particles of the dispersed material, it effects the formation of light bulking, hollow, solidified particles and controlling the bulking weight of the product by regulating the said temperature of the treating gas to a value sufficiently high to obtain the desired lightness of bulk.

8. In the spray processing of materials, the method of producing a heavy bulking product which comprises establishing a continuously flowing current of treating gas, dispersing the material to be treated in finely divided condition in said current of treating gas, heating said current of treating gas to a temperature, as it comes into contact with the particles of the sprayed material, sufficiently low to effect formation of relatively heavy solidified particles having walls of thickness which amounts to a substantial part of the total diameter of the particle, and controlling the heaviness of bulking weight of the product by regulating the said temperature of the treating gas to a value sufficiently low to obtain the desired bulking weight, the limiting maximum bulking weight being the bulking weight of the product when the component particles of the product are substantially all solid.

9. In the spray processing liquid materials of the class described which can be reduced to a continuous shape retaining condition self-sustaining in hollow particle form, the method of producing a light bulking product which comprises establishing a continuously flowing current of treating gas, spraying the liquid material being treated into said current of treating gas in finely divided dispersed condition, heating the said current of treating gas to an initial temperature, as it comes into contact with the particles of the said finely divided dispersed liquid material, which is sufficiently high to effect formation of hollow particles of material when certain degrees of viscosity at which the liquid material can be sprayed are used, and controlling the lightness of bulking weight of the product by controlling the viscosity of the said liquid material as sprayed to a value sufficiently high to obtain the desired lightness of bulk.

10. In the spray processing of liquid materials, the method of producing a spray processed product of relatively heavy bulking weight which comprises establishing a continuously flowing current of treating gas, spraying the liquid material into said gas current of finely divided dispersed condition, heating the said current of treating gas to a relatively low initial temperature so that in acting upon the particles of the sprayed liquid material it effects the formation of relatively heavy solidified particles having walls of thickness amounting to a substantial part of the total diameter of the particle, and controlling the bulking weight of the product by controlling the viscosity of the said liquid material as sprayed to a value sufficiently low to obtain the desired heaviness of bulk, the limiting maximum bulking weight being the bulking weight of the product when the particles of the product are substantially all solid.

11. In the spray processing of materials of the class described which can be reduced to a continuous shape retaining condition self-sustaining in hollow particle form, the method of producing a notably light bulking product which comprises establishing a continuously flowing current of treating gas, spraying the liquid material to be treated in finely divided condition into said current of treating gas, heating said current of treating gas to such temperature that, in coming into contact with the particles of the sprayed liquid material, it effects formation of light bulking, hollow, dried, solidified particles, controlling the bulking weight of the product by regulating the said initial temperature of the treating gas to a relatively high value to thereby increase the lightness of the product, and further increasing the lightness of the product by controlling the viscosity of the said liquid material as sprayed to a relatively high value, whereby a spray processed product composed of light, thin-walled, bubble-like particles controlled as to degree of hollowness is obtained.

12. In the spray processing of liquid materials, the method of producing a heavy bulking product which comprises establishing a continuously flowing current of treating gas, spraying the liquid material to be treated into said current of treating gas in finely divided dispersed condition, heating said current of treating gas to a relatively low temperature so that, in coming into contact with the particles of the sprayed liquid material, it effects formation of relatively heavy solidified particles having walls of thickness amounting to a substantial part of the total diameter of the particle, further increasing the bulking weight of the product by controlling the viscosity of the said liquid material as sprayed to a relatively low value, whereby a heavy bulking spray processed product is produced whose limiting bulking weight is that obtained when substantially all of the component particles of the material are solid.

13. In the spray processing of material of the class described which, under certain conditions of concentration and heat, can be reduced to a continuous coherent film-forming condition capable of inflation to hollow bubble-like form without disruption, the method of eliminating dust in the finished product which comprises establishing a continuously flowing current of treating gas, dispersing the material to be treated in finely divided condition in said current of treating gas, maintaining the temperature of the current of treating gas coming into contact with said finely divided dispersed material sufficiently high to volatilize a part of the material of the respective dispersed particles within the respective particles to thereby generate expansive forces which effect an inflation of the respective particles of material under treatment, whereby particles normally of dust size are inflated to a substantially larger size and thereby lose the characteristics of dust, and effecting solidification of the said inflated solidified particles and separating and collecting said particles from the current of treating gas to constitute the finished product.

14. The method of producing a spray dried product in rounded particle form from a liquid material small isolated particles of which will not shape themselves into spherical form but rather retain any shape given them, which comprises spraying liquid material of said character and thereby forming a spray composed of particles of irregular fragmentary shape, bringing a continuously flowing current of treating gas into contact with the said sprayed fragmentary particles, converting said irregular fragmentary particles into rounded particles by maintaining the temperature of the current of treating gas coming into contact with said sprayed fragmentary particles sufficiently high to effect a generation of gas within the respective particles which exerts expansive forces acting outwardly in all directions from within the respective particles, and thereafter effecting solidification of said rounded particles and collecting same to constitute a spray dried product in rounded particle form.

DALLAS R. LAMONT.